United States Patent [19]

Tominaga et al.

[11] 4,049,367

[45] Sept. 20, 1977

[54] APPARATUS FOR GENERATING SHOCK WAVES BY MEANS OF A SUPERSONIC PROJECTILE

[75] Inventors: Hiroshi Tominaga, Yokohama; Kazuo Yasunami, Amagasaki; Shinroku Saito, Yokohama; Masanobu Takamatsu, Yokohama; Akira Sawaoka, Yokohama, all of Japan

[73] Assignee: Tokyu Sharyo Seizo Kabushiki Kaisha, Tokyo, Japan

[21] Appl. No.: 404,043

[22] Filed: Oct. 5, 1973

[30] Foreign Application Priority Data

Oct. 6, 1972 Japan .............................. 47-100511

[51] Int. Cl.$^2$ ............................................ B01J 3/06
[52] U.S. Cl. ............................................ 425/77; 72/56; 124/60; 425/406
[58] Field of Search ............ 89/7, 8; 73/167, 12; 124/11; 102/DIG. 2; 72/56; 425/77, 405 H

[56] References Cited

U.S. PATENT DOCUMENTS

| 2,882,796 | 4/1959 | Clark et al. ............................... 89/7 |
| 3,204,527 | 9/1965 | Godfrey et al. ................... 73/167 X |
| 3,238,019 | 3/1966 | DeCarli ........................ 102/DIG. 2 |
| 3,311,020 | 3/1967 | Pialesi et al. ............................... 89/8 |
| 3,343,400 | 9/1967 | Rogers et al. ......................... 73/167 |
| 3,412,554 | 11/1968 | Voitsekhousky et al. ............ 89/8 X |
| 3,494,160 | 2/1970 | Tominaga et al. ..................... 72/56 |

Primary Examiner—Stephen C. Bentley
Attorney, Agent, or Firm—Blum, Moscovitz, Friedman & Kaplan

[57] ABSTRACT

An apparatus for generating shock waves by means of a supersonic projectile to effect, for example, phase transformation of a substance. A hammer in a cylinder is accelerated by introduction of compressed air into the cylinder, whereby a plunger formed integrally with the hammer at one end thereof is thrust into a hydraulic pressure chamber filled with a liquid and disposed coaxially with the cylinder. Thereupon, a high hydraulic pressure is generated in a hydraulic pressure chamber, and this hydraulic pressure accelerates a piston in a piston chamber connected with the hydraulic pressure chamber. The piston in turn compresses a light gas adiabatically to a high pressure, and a projectile fitted at one end of a barrel is thrust forward under the force of this high-pressure gas. The projectile is accelerated in the barrel and impacted onto a workpiece placed at the other end of the barrel at a speed higher than the sound velocity in the workpiece, whereby shock waves are produced in the workpiece and the workpiece is compressed under a superhigh pressure and at a high temperature to undergo the desired transformation.

6 Claims, 3 Drawing Figures

4,049,367

APPARATUS FOR GENERATING SHOCK WAVES BY MEANS OF A SUPERSONIC PROJECTILE

BACKGROUND OF THE INVENTION

In the transformation of a substance, for example, transformation of graphite to diamond, it is generally required to compress the original substance under superhigh pressure and at high temperature. In order to attain such a condition, the conventional art has employed static compression and heating simultaneously. However, this method has proved disadvantageous in that members subjected to the required high pressure are often damaged and moveover such a superhigh pressure cannot readily be produced.

Then has been proposed another method, in which a solid body is impacted against a workpiece at a supersonic speed to produce shock waves in the workpiece; the resultant superhigh pressure and high temperature are utilized for transformation of the substance of the workpiece. In order to accelerate the solid body to such a high speed, the conventional method has utilized explosive substances. However, this method is not suited for practice in a factory, because the handling of explosives is dangerous and moreover noise, vibration and detrimental combustion gases are produced. Further, this method has not been satisfactory in that it is difficult to control the impact speed with suitable accuracy. In order to overcome these difficulties of the prior art method, a further prior are method has been proposed, in which a high-pressure gas stored in a reservoir is used as a power source. However, this method also has many problems in practical use, since a gas compressor for producing such a high pressure is very expensive, and further, storage of a high-pressure gas is accompanied with danger.

SUMMARY OF THE INVENTION

An apparatus for generating shock waves by means of a supersonic projectile comprises a cylinder communicating alternatively with a compressed-air source or a vacuum source through a valve, a hammer slidably fitted in said cylinder and including a plunger formed integrally with the hammer, a hydraulic pressure chamber connected to the lower end of said cylinder in a coaxial relationship with same, in which a liquid such as water is charged, said hydraulic pressure chamber being provided with a plunger hole into which said plunger is adapted to enter slidably. The upper portion of said hydraulic pressure chamber is vented to the atmosphere, a piston chamber is connected to said hydraulic pressure chamber in which a piston, preferably stepped, is slidably accommodated, one end of said piston being located in a water passage communicated to said plunger hole and the other end of the piston being located in a gas chamber filled with a gas such as hydrogen gas having a low molecular weight, a barrel is connected to said gas chamber and is provided with an elongated through-hole constituting a passage for a projectile, a diaphragm is interposed between said gas chamber and the barrel for sealing one from the other, a projectile of hard material such as steel is closely fitted in said through-hole of the barrel in the proximity of said diaphragm, a workpiece holder is disposed at the other end of the barrel, and a vacuum source is adapted for communication with the through-hole of said barrel.

Accordingly, an object of the present invention is to provide an apparatus or producing extremely high pressure and high temperature in a workpiece.

Another object of the present invention is an apparatus for generating extremely high pressure and high temperature in a workpiece where said high pressure and temperature result from impact of a projectile against said workpiece at a velocity greater than the velocity of shock waves through said workpiece.

A further object of the present invention in an apparatus for producing a shock wave in a workpiece wherein low molecular weight gas is used to drive a projectile against said workpiece.

Still another object of the present invention is an apparatus for impacting a projectile against a workpiece at high speed, wherein the energy for driving said projectile originates in a high-pressure gas which drives a plunger into a liquid-filled pressure chamber, said pressure chamber being connected with one face of a piston, the other face of said piston being used to compress said low molecular weight gas for driving said projectile.

Yet another object of the present invention is an apparatus for generating a shock wave in a workpiece in which a diaphragm, selected to burst at a predetermined pressure, separates a low molecular weight gas from a projectile until said gas is compressed sufficiently to burst said diaphragm, thereby making the stored energy in said gas almost instantaneously available for transfer to said projecile.

An important object of the present invention is an apparatus for generating a shock wave in a workpiece wherein the shock and vibration of the operation are sharply mitigated by providing opposed hammers which absorb equal momenta during energy transfer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
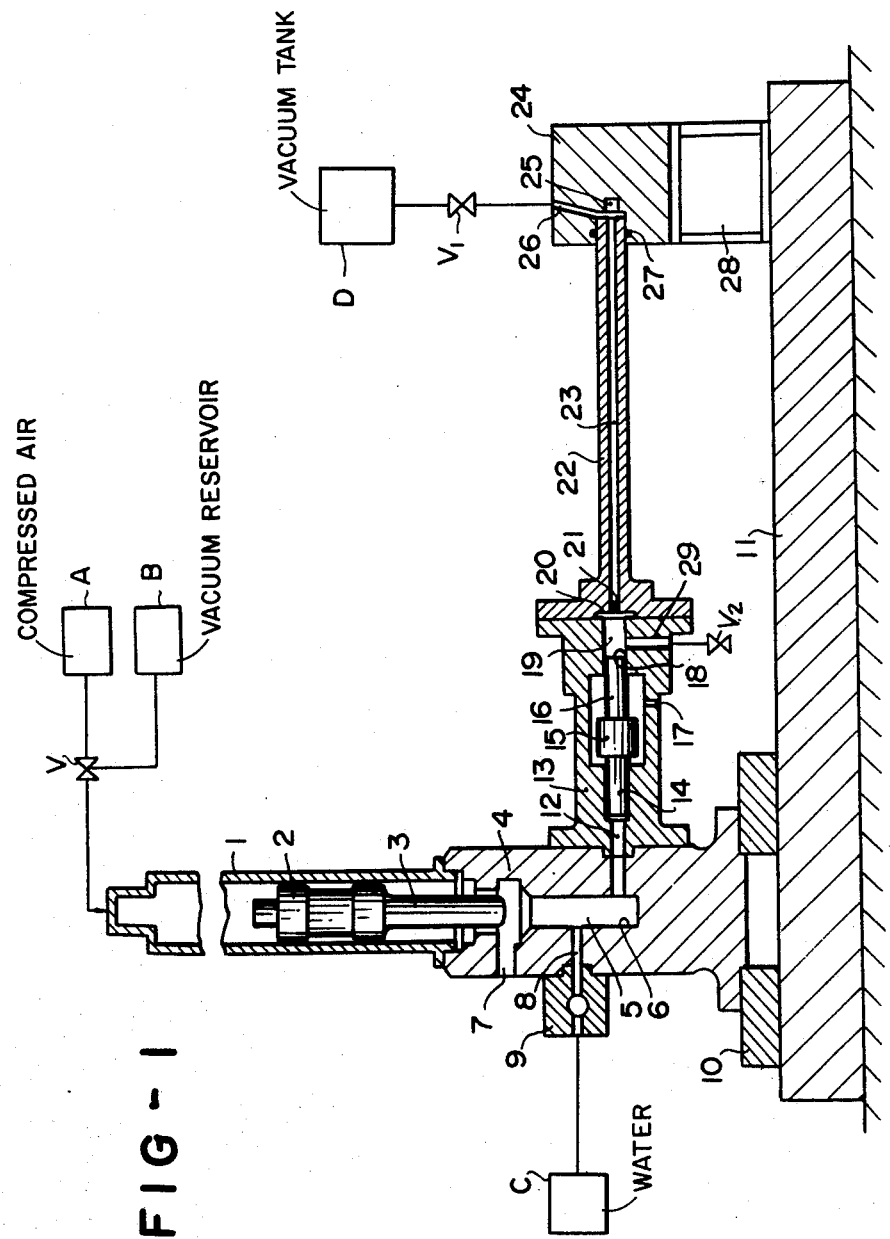
FIG. 1 is a vertical section of an apparatus in accordance with the present invention.

Referring now to FIG. 1, a hammer 2 provided with a plunger 3 at its lower end is disposed slidably in a cylinder 1. To the lower end of the cylinder 1 is coaxially connected a hydraulic pressure chamber 4 which includes a plunger hole 6 filled with an essentially incompressible, pressure-transmitting liquid such as water 5. The cylinder 1 is provided proximate its upper end with an opening connectable with compressed-air source A and a vacuum source B via valve means V, which controls communication therebetween. These elements constitute a hydraulic pressure generating section of the apparatus.

The pliunger 3 is formed coaxially and integrally with the hammer 2 at the lower portion thereof. The plunger hole 6 is vertical and has a size permitting plunger 3 to slide along the hole 6 in close contact with the same. The hydraulic pressure chamber 4 communicates with the atmosphere through an air port 7 provided at a level a little higher than the upper extremity of plunger hole 6. Thus, opening 7 also serves to maintain the free surface of the water 5 at a constant level, since superfluous water is allowed to flow out through the opening 7.

The plunger hole 6 communicates with a water source C through a water supply passage 8 and a one-way water-supply valve 9. Represented at 10 is a buffer rubber means for absorbing vibrations produced when the water 5 is pressurized. A base 11 on which the apparatus is installed is made of a material having a high rigidity and placed on a suitable ground, such as the floor of a mill. A piston chamber 13 communicates with the hydraulic pressure chamber 4 through a water passage 12 which has a piston 15 disposed slidably therein. The piston 15 is provided with a water side piston 14 at one end thereof adjacent the hydraulic pressure chamber 4 and a gas side piston 16 at the opposite end. One end of the water passage 12 communicates with plunger hole 6 and the other end opens to a cylindrical bore in which the water side piston 14 is slidably fitted. The piston chamber 13 includes at its central portion an enlarged hollow space, so that the central, large-diametered portion of the piston 15 may be permitted a limited axial displacement therein. The hollow space of the piston chamber communicates with the atomsphere through an air hole 17.

At the opposite side of the piston chamber 13 is provided a gas chamber 18 in which the gas side piston 16 is slidably fitted. The gas chamber 18 is filled with a gas 19 having a low weight, such as hydrogen. A diaphragm 20 is removably fitted at the outer end of the gas chamber 18 so as to hermetically retain the hydrogen gas 19 in the chamber 18. The material, thickness and configuration of the diaphragm 20 are so selected that the diaphragm 20 may be ruptured when the pressure of the hydrogen gas 19 in the chamber 18 exceeds a predetermined value, and the hydrogen gas may be ejected therethrough.

A barrel 22 is connected to the gas chamber 13, and an elongated through-hole or bore 23 is provided therein. The elongated hole 23 affords a passage for a projectile, and one end of the hole 23 is adjacent to the diaphragm 20. A sealing means such as an O-ring (not shown) may be used, if necessary, adjacent the diaphragm 20 in order to prevent leakage of the hydrogen gas from the chamber 18.

A projectile 21 made of solid material such as steel is slidably fitted in the hole 23 adjacent the diaphragm 20. The forward end of the barrel 22 is loosely fitted in a holder 24 for holding a workpiece 25 therein. Air tightness between the barrel 22 and the holder 24 is ensured by means of a seal 27. The holder 24 is provided with a vent hole 26, one end of which opens into the elongated hole 23 and the other end of which is connectable to a vacuum tank D via a valve $V_1$. Represented at 28 is a support for securely supporting the holder 24 in place. A workpiece 25 placed in the holder 24 is a substance to be transformed by impacting the projectile 21 thereagainst at an extremely high speed. The workpiece may be prepared, for instance, by shaping graphite powder into a cylindrical form through compression molding.

In case that the apparatus is to be used for industrial purposes, additional structures, such as means for charging a predetermined volume of gas 19 into gas chamber 18 at one cycle of operation, means for replacing the diaphragm 20, means for replacing a used projectile by a fresh one, and means for facilitating the setting of workpiece 25 are removal of the produce substance by the aid of gas pressure supplied through a suitable gas conduit or by arranging a gate at some portion of the apparatus, may be provided.

Figure 2:
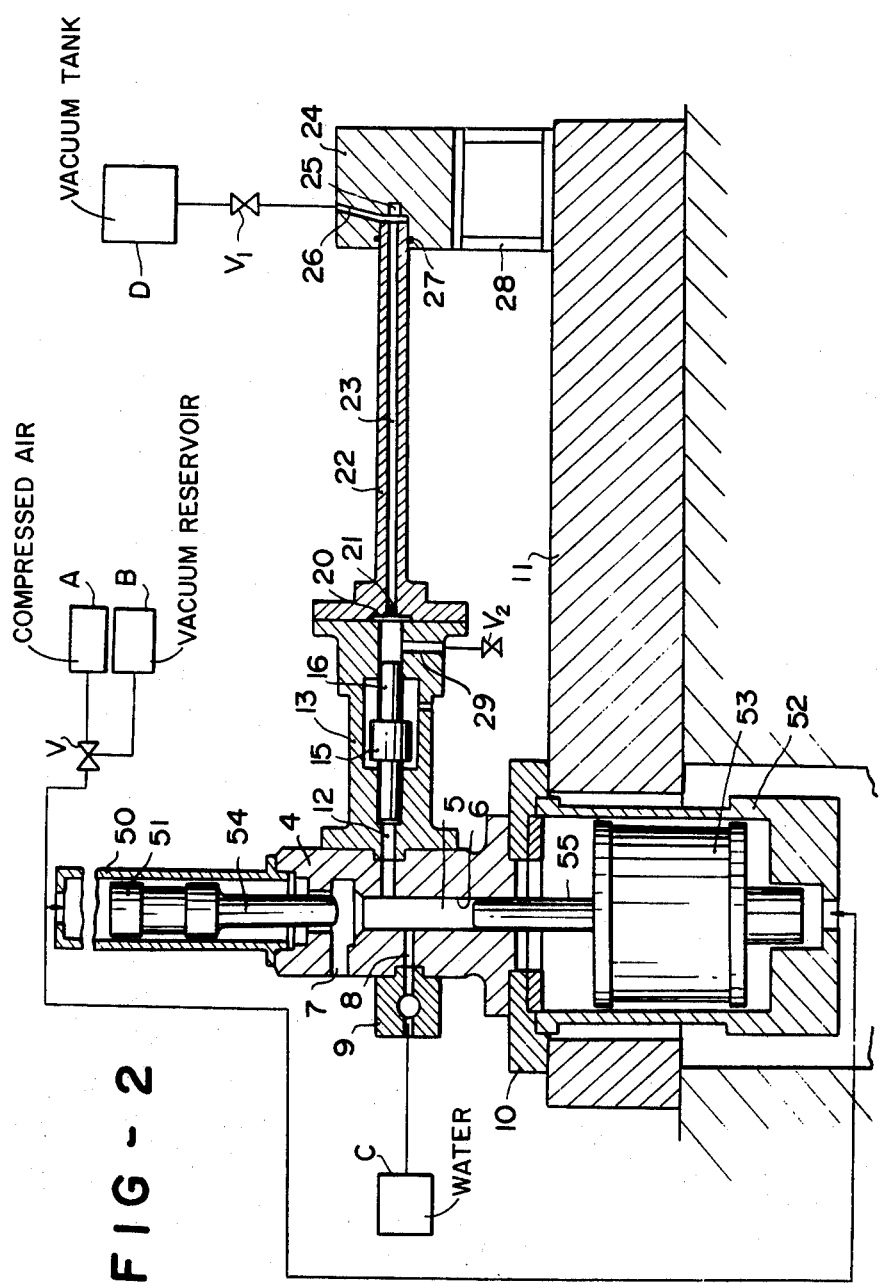
FIG. 2 is a vertical section of a second embodiment of the present invention.

Means for charging a predetermined volume of gas 19 into gas chamber 18 is shown in FIGS. 1 and 2 as an opening 29 in piston chamber 13, where the opening 29 is connected by means of valve $V_2$ to a gas cylinder (not shown), the gas preferably being hydrogen, though helium functions satisfactorily also.

In connection with piston 15, the diameter of the water side piston 14 is not necessarily equal to that of the gas side piston 16. Since the weight of the piston 15 is given separately to meet the requirements for energy transmission, it is necessary to satisfy the weight conditions by adjusting the length and the diameter of the central portion. Thus, it is reasonable to design the piston 15 in a stepped form as illustrated in FIG. 1.

In the apparatus of the present invention, compressed gas is used as power source as described in the foregoing. Further, it will be understood that as a first energy-transmitting medium is used a liquid such as water, oil or glycerine in the hydraulic pressure chamber 4, and as a second energy-transmitting medium is used a light gas such as $H_2$ gas or He gas filled in the gas chamber 13.

Thus FIG. 1 shows the state of the apparatus when plunger 3 enters hydraulic chamber 4. At the start of operation, hammer 2 is set by gravity at the lowest level in cylinder 1, with plunger 3 fixed at the extremity of hammer 2. New diaphragm 20 and projectile 21 as well as workpiece 25 are mounted at the aforementioned positions as illustrated in FIG. 1. Then gas chamber 18 is fed with hydrogen gas 19 at a fixed pressure (examples are given below), so that piston 15 is pushed leftward to reach the left end of the stroke as shown in the Figure, leaving gas chamber 18 at the maximum volume. Charging of hydrogen gas to chamber 18 is stopped when the desired pressure is reached and valve $V_2$ is closed, rendering chamber gas-tight. Air is extracted from elongated bore 23 through the connection between vent hole 26 and vacuum tank D, so that the through-hole may be maintained at a level close to vacuum.

Water 5 is poured into plunger hole 6 through water supply valve 9 and water supply passage 8, while the upper end of the chamber of cylinder 1 is connected to vacuum reservoir B via valve means V to draw hammer 2 to the top of cylinder 1. Water supply valve is shut as soon as plunger hole 6 is filled and water begins to overflow through opening 7. At this stage, water passage 12 is also completely charged with water 5.

For the aforementioned preparation of the machine, actual opening and closing of valves and detection of fixed operations can be conducted successively by electrical operations, so that the machine is ready for operation in a short time.

Next, compressed air of ordinary pressure, e.g., 15 atm, is introduced into cylinder 1 from the compressed air source A via external valve V, and simultaneously cylinder 1 is disconnected from vacuum reservoir B.

Hammer 2 is thereby accelerated to a speed of about 30 m/s, causing the lower end of plunger 3 to enter plunger bore 6 and transferring its kinetic energy; the high pressure generated is conveyed to the water-side end surface of piston 14 attached to piston 15, so that the latter piston may be pushed to the right as in FIG. 1.

Piston 15 is initially held at the left end by the pressure of hydrogen gas 19. The hydraulic pressure of water 5 rises until the rightward pressure against the piston exceeds the leftward pressure of the gas, at which point piston 15 is thrust to the right virtually instantaneously, compressing hydrogen gas 19 to an extremely high pressure.

When the pressure of hydrogen gas 19 reaches a predetermined value, e.g., 2,000 atm, during this process, the diaphragm is ruptured, so that the pressure of hydrogen gas 19 is directly exerted against the back of projectile 21. Gas side piston 16 continues compression of hydrogen gas 19 to higher pressure, which accelerates the movement of projectile 21 along elongated bore 23 in barrel 22. Projectile 21 is thrust at increasing speed by the enormous acceleration force, which reaches, for example, a superhigh speed of 3,000 m/s at the outlet of elongated hole 23. Projectile 21 is effectively accelerated by the advantageous design features of the machine as follows: the elongated hole 23 is at virtually zero pressure absolute, presenting no appreciable air resistance, and the gas accelerating the projectile has a specific weight low enough to minimize the resistance to its own movement; a little leakage of hydrogen gas through the opening around the projectile has the effect of decreasing the high speed friction between the projectile and elongated hole wall.

Projectile 21 that emerges from barrel 22 collides against workpiece 25 at a superhigh speed exceeding the velocity at which sound travels inside the volume of workpiece, generating shock waves inside workpiece 25. These shock waves produce an instantaneous high pressure of several hundreds of thousands of atmosphere and simultaneous high temperature in the workpiece, so that transformation is achieved as desired.

Seal 27 is provided to produce an airtight structure of the elongate through-hole that maintains the initial vacuum inside the barrel and to prevent the leakage of the high-pressure gas to outside at the later stage of operation, while support 28 is provided to fix holder 24 on bed 11. The compressed air that has been introduced in cylinder 1 is vented from the opening at top through the valve means at the end of each cycle of operation.

FIG. 2 below illustrates another embodiment of the invention, which differs from FIG. 1 in the design of the hydraulic pressure generation mechanism. The embodiment shown in FIG. 1 is more economical and convenient in the design of relatively small apparatus, while that shown in FIG. 2 is more suitable for treatment of larger quantities of material.

With the design illustrated in FIG. 1, the shock and vibration generated in association with the hydraulic pressure generation are conveyed to bed 11 of the apparatus, causing the entire machine to vibrate, though the intensity of the vibration is reduced somewhat across buffer rubber means 10. In the design illustrated in FIG. 2, moment upward and downward which cancel each other are produced during the process of hydraulic pressure generation, so that the shock and vibration generated are not transmitted exterior to the hydraulic pressure chamber. Thus in the second embodiment a substantial reduction in vibration is achieved with the machine.

Referring to FIG. 2, details are given only with respect to the part of the machine design that is different from that in FIG. 1. Small hammer 51 and large hammer 53 can slide along small cylinder 50 and large cylinder 52, respectively. The two hammers and plungers are arranged coaxially and at opposed positions across hydraulic pressure chamber 4 through which passes cylindrical plunger hole 6. While hammers 51 and 53 are at outer ends of cylinders 50 and 52, hydraulic pressure chamber 4 is fully charged with a liquid such as water 5. Plungers 54 and 55, which are connected integrally to the aforementioned small hammer 51 and large hammer 53, respectively, are designed to fit slidingly with minimum clearance in the aforementioned plunger hole 6. To prevent water 5 from leaking from the inside to outside of hydraulic chamber 4, the length of hammer 55 is such that it protrudes into plunger hole 6 when hammer 53 is at its outermost, i.e., bottom position. Small cylinder 50 and large cylinder 52 have respective openings at their own ends, which led to the same compressed-air source A and vacuum reservoir B through valve means V.

The end of large hammer 53 that is exposed to the compressed air is fabricated in a stepped reduced diameter. The masses and diameters of the two hammers are chosen to satisfy the equality, $m_1/m_2 = S_2/S_1$, where the mass and stroke of small hammer 51 and those of large hammer 53 are expressed by $m_1$ and $S_1$ and $m_2$ and $S_2$, respectively. It should be noted that $m_1$ and $m_2$ include the masses of plungers 54 and 55, respectively.

Thus according to this embodiment, when the hydraulic pressure is generated by the slow movement of hammer 53 of large mass $m_2$ along a relatively short stroke and the rapid movement of hammer 51 of small mass $m_1$ along a longer stroke, the momenta upward and downward cancel out each other, protecting the machine from vibration. Therefore, the large machine can be designed effectively without difficulty due to vibration.

What is important in the above designs of FIG. 1 and 2 is the percentage of the kinetic energy of the hammers which is effectively converted into kinetic energy of the projectile. This depends on a number of parameters, such as masses of respective moving parts, diameters of pistons, plungers and projectile, initial volumes of water and gas, gas pressure at the rupture of diaphragm, length of the elongated through-hole and speeds of hammers.

Figure 3:
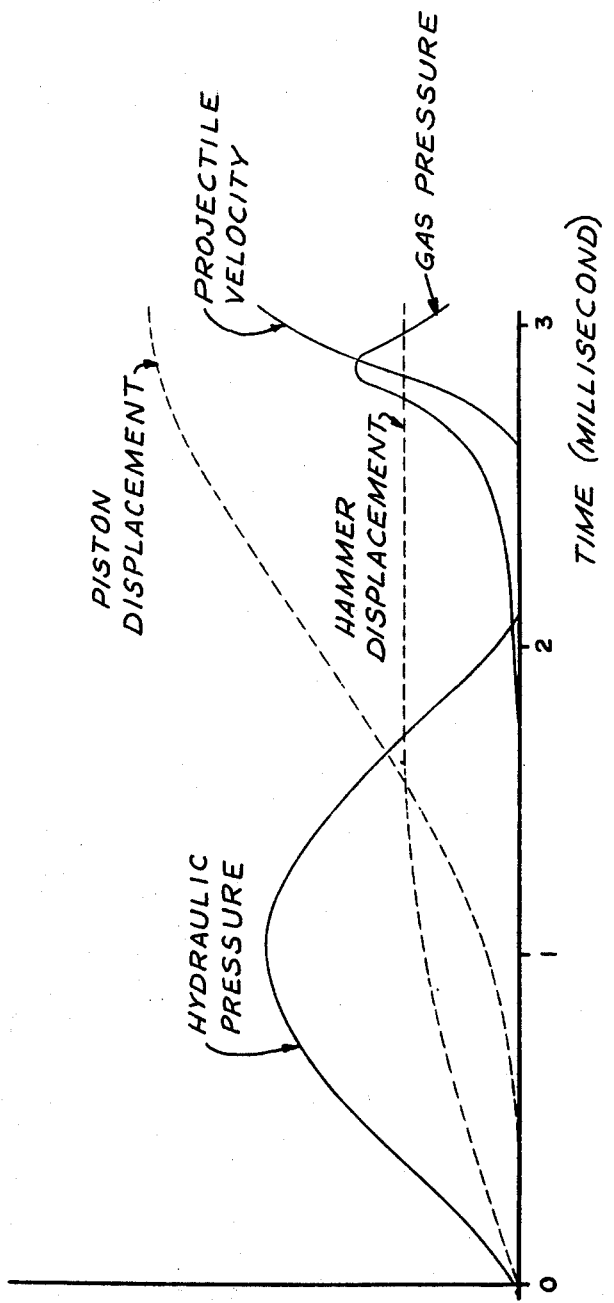
FIG. 3 is a graph showing hydraulic pressure, gas pressure, displacement of a hammer, displacement of a piston, and velocity of a projectile as a function of time.

Ideally it is to be desired that the conditions are fulfilled that both hammers have totally lost speeds and stopped, hydraulic pressure has returned to zero, and all pistons have stopped before the initiation of collision with work body or material 25, while compression energy of the gas has been delivered so effectively to the projectile for acceleration that the pressure that remains at the time of collision is negligible. It is difficult, however, to establish the optimum set of parameters which satisfy the aforementioned conditions, considering the instantaneous high-speed movement of the projectile and the fact that the total transmission time of the projectile through passage 23 is about 0.003 sec. However, it is very important to determine the aforementioned optimum set of parameters for the process carried out in the practical embodiment of this invention. Therefore a large number of simulation calculations have been performed with the use of the electronic computer, which have resulted in a set of parameters that are adequately close to the ideal conditions. The results are illustrated by the behavior of machine components as shown in FIG. 3. The ordinates in FIG. 3 are arbitrary units; a numerical example can be given as follows. Assuming that weights of the small hammer, large hammer, piston and projectile are 45, 450, 12 Kg, and 1 g respectively, that the diameters of the plunger, water side piston, gas side piston, and projectile are 80, 60, 60, and 5.7 mm respectively, the volume of water and the initial volume of gas are 1,600 and 283 cc, the initial gas pressure and the gas pressure at the moment of rupture of the diaphragm are 100 and 2,000 atm, and the length of the elongated throughhole is 1 m, then the hydraulic pressure and gas pressure to be produced reach 2,252 and 6,104 atm at maximum, the projectile attains a speed of 4,756 m/s, while at the instant of collision the hammers and the piston come almost to rest and the hydraulic pressure is returned to zero.

As is evident, the intensity of the shock wave to be produced is the controlling element in the design. Whether the desired intensity is greater or less than that resulting from the parametric values illustrated above, suitably adjusted values can be selected by the skilled artisan using conventional procedures for machines or other sizes.

This invention makes use of the high pressure and high temperatures brought about by the shock waves that are in turn generated by making a solid of adequate strength such as a piece of steel collide against the workpiece at a speed exceeding the sound velocity in the volume of workpiece. For this purpose the hammer is accelerated along the cylinder by the motive force of compressed air, and the plunger that is fixed at the extremity of the hammer is thereby thrust at a high speed into the liquid involved in the hydraulic pressure chamber to generate an instantaneous high hydraulic pressure, which is applied to the light gas via the piston for adiabatic compression. The high-pressure gas thus produced is used as an energy source to accelerate a solid along the through-hole and make it collide against the workpiece set in front of the through-hole at an extremely high speed, so that such great speed is made available safely and effectively at minimum loss of energy with a very simple design of machine. To generate an instantaneous pressure of several hundreds of thousands of atmospheres, collision of a solid is used at a speed higher than the sound velocity in the workpiece itself and to move such a solid at a speed exceeding the sound velocity in the workpiece a projectile is accelerated along the through-hole by the high pressure of a low molecular weight gas, so that the operation is safe, and is accompanied with a minimum generation of noise. To obtain such high-pressure gas, an instantaneous gas compression mechanism driven by a high liquid pressure is adopted in this invention and such high liquid pressure is generated in turn by accelerating the hammer to a high speed in the cylinder by compressed air and thereby making the plunger directly coupled with such hammer rush at a high speed into the hydraulic pressure chamber. Thus the kinetic energy of the hammer produced by the compressed air is finally converted into the kinetic energy of the projectile for shock working via the compression stress energy of water, kinetic energy of the piston and the compression energy of a gas, so that the purpose is achieved safely with use of a moderately compressed air commonly available at factories as the energy source but without any use of an explosive powder or high-tennsion current that is accompanied with dangers in handling. Furthermore the machine can be controlled easily and accurately to obtain the required projectile velocity by adjusting the gas pressure at the rupture of diaphragm and the pressure of the compressed air used to propel the hammers, so that the machine is very useful for production on a commercial basis where accurate and reproducible control of the machine is needed. In addition to the above advantages the input energy can be effectively converted into the kinetic energy of the projectile and a projectile speed of 4,000 m/s can be achieved. Such a speed cannot be generally attained even with explosives, which makes the machine valuable as a practical apparatus for operations where such speed is needed.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An apparatus for generating shock waves, comprising a first vertical cylinder connectable selectively at its upper end to a source of compressed gas or to a vacuum source, a first hammer fitting slidably within said first cylinder, a first cylindrical plunger coaxial and integral with the lower end of said first hammer, a hydraulic pressure chamber communicating with said first cylinder and having an axial hole dimensioned and disposed to receive said first plunger slidably with minimum clearance, said hydraulic pressure chamber having a vent hole means above said axial hole for establishing a liquid level in said hydraulic pressure chamber when liquid is transferred in excess into said hole, a piston chamber having first and second coaxial cylindrical ends, said first cylindrical end being hydraulically connected with said pressure chamber, a piston fitting slidably within said first and second ends, said piston being continuously reciprocable within said piston chamber, said second cylindrical end and the end of said piston therein forming a gas chamber fillable with a gas of low molecular weight, said second end of said piston chamber having an exit vent, a diaphragm blocking said exit vent and being selected to burst at predetermined pressure on compression said low molecular weight gas by said piston, a barrel having an elongated bore therethrough connected removably at one end thereof to said piston chamber at said vent, said bore at said one end and said other end of said piston chamber being gastightly connected when said diaphragm is burst, said barrel being adapted for holding a projectile slidably in said bore at said one end thereof, and a holder for holding a workpiece at the other end of said barrel, said holder being vented.

2. An apparatus for generating shock waves as defined in claim 1, further comprising a vacuum source connectable to said holder vent.

3. An apparatus for generating shock waves, as defined in claim 1, wherein said hammer is stepped.

4. An apparatus for generating shock waves as defined in claim 1 wherein said plunger hole penetrates the bottom of said hydraulic pressure chamber, and further comprising a second cylinder gas-tightly connected with said plunger hole at the bottom end thereof and coaxial therewith, a second hammer fitting slidably in said second cylinder, the diameter and mass of said second piston being substantially greater than those of said first piston, and a second plunger integral with said second hammer, said second plunger fitting slidably in said plunger hole, the bottom end of said second cylinder being connectable to an external pressure source and an external vacuum source to be pressurized and evacuated in synchrony with said upper end of said first cylinder.

5. The apparatus for generating shock waves, as defined in claim 4, wherein said first and second cylinders are long enough so that masses and strokes of same, as represented respectively by $m_1$, $S_1$, $m_2$ and $S_2$, may be adjusted to conform to the relationship $m_1/m_2 = S_2/S_1$.

6. The apparatus for generating shock waves, as defined in claim 4, wherein said second hammer is stepped.

* * * * *